United States Patent
Edgren (10) Patent No.: US 9,950,568 B2
(45) Date of Patent: Apr. 24, 2018

(54) CONTROL ARRANGEMENT FOR AUTONOMOUSLY DRIVEN VEHICLE

(71) Applicant: VOLVO CAR CORPORATION, Gothenburg (SE)

(72) Inventor: Claes Edgren, Trollhattan (SE)

(73) Assignee: Volvo Car Corporation, Gothenburg (SE)

( * ) Notice: Subject to any disclaimer, the term of this patent is extended or adjusted under 35 U.S.C. 154(b) by 33 days.

(21) Appl. No.: 14/600,055

(22) Filed: Jan. 20, 2015

(65) Prior Publication Data
US 2015/0210272 A1 Jul. 30, 2015

(30) Foreign Application Priority Data
Jan. 30, 2014 (EP) .................................... 14153277

(51) Int. Cl.
| | |
|---|---|
| *G01C 22/00* | (2006.01) |
| *G05D 1/00* | (2006.01) |
| *B60C 9/00* | (2006.01) |
| *B60W 30/00* | (2006.01) |
| *G08B 6/00* | (2006.01) |
| *B60W 50/16* | (2012.01) |
| *G06F 3/01* | (2006.01) |
| *G06F 3/0338* | (2013.01) |

(52) U.S. Cl.
CPC ............... *B60C 9/00* (2013.01); *B60W 30/00* (2013.01); *B60W 50/16* (2013.01); *G05D 1/0061* (2013.01); *G06F 3/016* (2013.01); *G06F 3/0338* (2013.01); *G08B 6/00* (2013.01); *G05D 2201/0213* (2013.01)

(58) Field of Classification Search
CPC ................................. B60W 30/00; B60Q 9/00
See application file for complete search history.

(56) References Cited

U.S. PATENT DOCUMENTS

| | | | |
|---|---|---|---|
| 5,548,516 A | 8/1996 | Gudat et al. | |
| 5,765,116 A * | 6/1998 | Wilson-Jones | B62D 15/025 180/168 |
| 6,559,764 B1 | 5/2003 | Neuner et al. | |

(Continued)

FOREIGN PATENT DOCUMENTS

| | | |
|---|---|---|
| DE | 19810479 A1 | 9/1999 |
| DE | 102012002304 | 8/2013 |

(Continued)

OTHER PUBLICATIONS

Extended European Search Report for EP 14153277.0, Completed by the European Patent Office, dated Aug. 1, 2014, 8 Pages.

(Continued)

*Primary Examiner* — Imran Mustafa
(74) *Attorney, Agent, or Firm* — Brooks Kushman P.C.

(57) ABSTRACT

An interface arrangement is provided for use in a vehicle having an autonomous drive (AD) system. The interface arrangement is an interface between a user of the vehicle and the autonomous drive (AD) system. The interface arrangement includes a manually operated communication device movable between multiple predetermined positions and configured to input commands into the autonomous drive (AD) system. Each predetermined position of the manually operated communication device codes for a command to the autonomous drive system.

15 Claims, 8 Drawing Sheets

(56) References Cited

U.S. PATENT DOCUMENTS

| | | |
|---|---|---|
| 7,970,514 B2 | 6/2011 | Aeberhard et al. |
| 2002/0137570 A1 | 9/2002 | Castellon |
| 2003/0055538 A1 | 3/2003 | Yanaka |
| 2004/0124023 A1* | 7/2004 | Plishner ............ B60G 17/0157 180/170 |
| 2006/0119474 A1 | 6/2006 | Requejo et al. |
| 2009/0038282 A1* | 2/2009 | Avalle .................. A01D 51/002 56/10.8 |
| 2009/0157247 A1 | 6/2009 | Sjögren et al. |
| 2009/0287367 A1 | 11/2009 | Salinger |
| 2009/0299573 A1 | 12/2009 | Thrun et al. |
| 2011/0032119 A1 | 2/2011 | Pfeiffer et al. |
| 2011/0241852 A1 | 10/2011 | Braun et al. |
| 2012/0022716 A1 | 1/2012 | Kitahama et al. |
| 2012/0083960 A1* | 4/2012 | Zhu ...................... G05D 1/0214 701/23 |
| 2012/0166032 A1 | 6/2012 | Lee et al. |
| 2012/0173069 A1 | 7/2012 | Tsimhoni et al. |
| 2012/0271500 A1* | 10/2012 | Tsimhoni ................. B62D 1/28 701/23 |
| 2014/0078102 A1 | 3/2014 | Araki |
| 2014/0118126 A1 | 5/2014 | Garg et al. |
| 2015/0006013 A1* | 1/2015 | Wimmer ............... B60W 50/14 701/23 |
| 2015/0060185 A1* | 3/2015 | Feguri ....................... B60T 7/10 180/333 |
| 2015/0210272 A1 | 7/2015 | Edgren |

FOREIGN PATENT DOCUMENTS

| | | |
|---|---|---|
| DE | 102012002318 | 8/2013 |
| DE | 102012002581 | 8/2013 |

OTHER PUBLICATIONS

U.S. Non-Final Office Action for U.S. Appl. No. 14/694,251, dated Jun. 10, 2016, 12 pages.
U.S. Non-Final Office Action for U.S. Appl. No. 14/694,251, dated Jan. 10, 2017, 13 pages.
Extended European Search Report for EP 14166603.2, completed by the European Patent Office, dated Jul. 28, 2014, 7 pages.
U.S. Final Office Action dated May 8, 2017, U.S. Appl. No. 14/694,251, 24 Pages.
U.S. Non-Final Office Action dated Feb. 12, 2018, U.S. Appl. No. 14/694,251, 21 pages.

* cited by examiner

CONTROL ARRANGEMENT FOR AUTONOMOUSLY DRIVEN VEHICLE

CROSS-REFERENCE TO RELATED APPLICATIONS

This application claims foreign priority benefits under 35 U.S.C. § 119(a)-(d) to European patent application number EP 14153277.0, filed Jan. 30, 2014, which is incorporated by reference in its entirety.

TECHNICAL FIELD

The disclosure pertains to an interface arrangement between a user of a vehicle and an autonomous drive system of the vehicle.

BACKGROUND

A vehicle having a fully developed autonomous drive system or AD system is capable of being safely steered and maneuvered through traffic without the need for a human driver using driving equipment such as a steering wheel or pedals while the vehicle is driven in AD mode. In order for the vehicle to be autonomously driven, the user has to input an initial driving instruction, such as a destination into the AD system. However, there are situations when the user may want to influence the driving of the vehicle during the drive. Some such situations may occur when the user wants the vehicle to stop before reaching a final destination, when a lane change is desired, when a change in final destination is desired, when the user wants to take another route to a final destination, etc.

An alternative would be for the user to switch from AD mode to manual drive mode or MD mode and completely take over command of the vehicle and continue driving the vehicle using the steering wheel and other driving equipment. However, the user may instead want to retain the convenience of being safely transported in a vehicle that steers, accelerates, and brakes automatically, while still being able to influence the driving, if desired.

US 2003/0055538 A1 relates to a device for manually operating a vehicle, which is provided with an operating lever supported so as to be able to be displaced (tilted) with respect to a vehicle body. The vehicle is steered and accelerated according to a displacement position of the operating lever operated by the driver. The aim in US 2003/0055538 A1 is to ascertain that the steering device is in a position at start where it does not cause the vehicle to accelerate or to take off against the wishes of the driver.

US 20117032119 A1 relates to a driver assistance system where information on the surrounding traffic situation is output by signals via vehicle control elements to a driver in order for the driver to handle a current traffic situation. The vehicle is manually driven and comprises control elements such as a steering wheel, a brake pedal, and an accelerator pedal. The information from the driver assistance system to the driver is output via the vehicle control elements. Alternatively, the steering wheel, brake pedal, and accelerator pedal, may be substituted by a joystick which integrates the functions of the three aforesaid vehicle control elements, either in part or completely.

U.S. Pat. No. 7,970,514 B2 relates to a control system for a vehicle adapted for disabled people and comprising a steering operating element in the form of a joystick. Via the joystick, a driver can operate steering, throttle and brake and the use of a force feedback system is described.

Accordingly, there remains a need for an improved interface between a user of a vehicle which is equipped with an AD system and the AD system.

SUMMARY

An object of the disclosure is to provide new equipment allowing a user of a vehicle which is equipped with an AD system to interact with the vehicle AD system while the vehicle is being driven in the AD mode. This and other objects are achieved by an interface arrangement for use by a user of a vehicle having an autonomous drive system, the interface arrangement being an interface arrangement between the user and the autonomous drive system. The interface arrangement comprises a manually operated communication device which is arranged to be movable between multiple predetermined positions and to input commands into the autonomous drive system, wherein each pre-determined position of the manually operated communication device codes for a command to the autonomous drive system.

A pre-determined position, as used herein, is any position of the communication device which corresponds to a command to the autonomous drive system. Accordingly, a pre-determined position may be a distinct position, such as a resting position which may be used to input a command to make a driving maneuver such as a turn, a lane change, etc. A predetermined position may also be a position along a line of movement of the communication device where movement along the line continuously shifts the communication device between continuously arranged predetermined positions along the line of movement. Command positions which are arranged in a non-stepwise, continuous manner along a line of movement of a communication device may be used to input a command to make a quantifiable maneuver such as a speed change or a shift in position within a lane. It is to be appreciated that the line of movement may be a straight line or a curved line.

The multiple predetermined positions may include three or more discrete positions, such as five or more discrete positions.

The multiple predetermined positions of the interface arrangement as disclosed herein may include discrete resting positions as well as positions arranged continuously and non-stepwise along a line of movement of the communication device.

The interface arrangement disclosed herein allows a user to intervene in pre-programmed driving by an AD system in a vehicle and to continuously change the driving instructions to the vehicle AD system. By modifying the original driving instructions input to the AD system, it is possible for a user of the vehicle to continuously adapt the driving of the vehicle to changing passenger requirements. When the user using the communication device of the disclosure has input a command into the AD system and the AD system has accepted the command, planning and execution of the command is carried out autonomously by the vehicle. Accordingly, the communication device as disclosed herein permits a vehicle which is equipped with an AD system to be driven in a manner that may be referred to as being "semi-automatic". The semi-automatic driving arrangement affords all the advantages of an autonomous driving mode, such as safe and automatic lane changes, speed changes, steering, etc. and combines these advantages with the advantages of a manually driven vehicle such as a possibility of making un-planned stops, route changes, etc. Accordingly, the semi-automatic driving arrangement will appear as having a built-in private chauffeur in the vehicle.

The interface arrangement as disclosed herein may be configured to output haptic signals from the autonomous drive system to the communication device in response to input commands received by the autonomous drive system from the communication device. A haptic signal, as used herein, is any type of communication signal involving touch. Haptic signals may, for instance, be in the form of vibrations, single or multiple pulses, a sense of resistance or inertia when trying to move the communication device, or the opposite, i.e. a sense that the communication device can be easily shifted, without any perceivable resistance.

By means of the interface arrangement, information from the AD system concerning status of driving conditions and of an in-put command may be continuously communicated to the passenger using the communication device. Such haptic feedback from the AD system may guide the user who is in control of the communication device on which function and mode the vehicle system is in. By applying an easy-to-learn, intuitive and logical "language" for moving the communication device between the different command positions, the controlling user can easily give commands to the vehicle, e.g. concerning which direction to turn, whether to change lanes, etc. In return, the user may get back information from the AD system. The user may be informed of the status of the AD system, such as if the command that has been input by the user has been accepted by the AD system or whether or not there are problems with the system's capability of carrying out the requested command.

The communication device may be movable in the x-y plane in a conventional rectilinear geometry and optionally also in the z-direction, perpendicular to the x-y plane. Communications devices that are movable in a curved geometry, such as around a ball-and-socket joint or communication devices which are movable both in an x-y plane and in a curved geometry are also contemplated within the scope of the disclosure. A communication device of this kind may comprise a joystick or may be a joystick. The joystick may be placed in a location that is intuitive to a driver/user who is to control the joystick. Such location may be where a gear stick is conventionally placed in a vehicle. The joystick may be similar in design to an automatic gear-stick and may share functionality with an automatic gear-stick when the vehicle is in a manual driving mode.

It should be noted that the communication device as disclosed herein cannot be realized by a simple switch or a push-button.

Although it may generally be provided that the interface arrangement comprises only a single communication device, the interface arrangement may comprise two or more communication devices.

In the interface arrangement as described herein, the pre-determined positions of the communication device may be arranged to code for one or more of the following commands:
 a vehicle stop;
 a lane change;
 a left turn;
 a right turn;
 a change in vehicle speed;
 an overtaking of a preceding vehicle;
 entering or exiting autonomous drive (AD) mode.

In the interface arrangement as described herein, a haptic signal to be output to a person using the interface arrangement may be chosen from one or more of:
 a vibration;
 a resistance to movement;
 a play around a resting position or a control position;
 a snap-in function;
 a failure to lock the communication device in a new position.

A vibration that can be felt by the user of the interface arrangement when operating the communication device may, for instance, be employed to indicate to the user that the vehicle is about to leave a lane, that further speed adjustment cannot be made or that the conditions for autonomous driving are not perfect, but still satisfactory for using the autonomous drive system.

By varying amplitude and frequency of the vibrations it is possible to qualify the type of information and/or the urgency of the information that is being transferred to the user of the communication device. By example, a rapid, vigorous vibration may signal that an input command is cannot be accepted by the AD system while a small pulsating motion may signal that a speed adjustment limit has been reached. A vibrating motion such as a pulsation may be used to emulate the feeling that is experienced when a vehicle crosses profiled road markings.

A resistance to movement may be used to indicate that the communication device is being moved out of a pre-determined command position or out of a rest position. Correspondingly, the user may experience a sensation of resistance to further movement when the communication device has been moved into a command position or a rest position. A resistance to movement may be achieved by arranging one or more obstacles in the path of movement of the communication device. Such obstacles may be in the form of ridges, knobs, springs, etc. which require that additional force is applied to the communication device in order to move it past the obstacle.

The communication device may be arranged to communicate an autonomous drive performance loss to a user of the interface arrangement when the conditions for using the autonomous drive system are below a predetermined optimal level, said performance loss being perceptible as a changed feeling of said communication device when said communication device is in an autonomous drive resting position.

The predetermined optimal level of the autonomous drive conditions may be referred to as the conditions when all sensors, actuators, and other components of the AD system are working as expected. An AD performance loss may be referred to as a situation in which external conditions (e.g. unclear road lane markers, poor antenna reception, poor visibility) or internal conditions (e.g. dirty or un-calibrated sensors) affect the AD system in a way so that the safety margin to the lowest acceptable and safe level is diminished. The consequence of a performance loss may be that some features of the AD system are no longer available or their operational range, e.g. speed, is limited.

In order to signal a performance loss, the autonomous drive resting position may be arranged to be perceived as a distinct position when gripping the communication device in a case when no performance loss is detected by the autonomous drive system. When a performance loss is detected by the autonomous drive system, the communication device may be arranged to be perceived as a having a play around the autonomous drive resting position and be freely movable within a limited area surrounding the autonomous drive resting position.

It should be understood that the above described way of indicating a performance loss of an autonomous drive system may be used independently of the interface arrangement as disclosed herein. Accordingly, any vehicle comprising an autonomous drive system may be provided with a control element being designed to convey haptic information to a user of the vehicle about the status of the AD system with regard to driving conditions. Likewise, a control element designed in this manner may be used together with differently designed interface arrangements. Such control elements may include any type of switch, such as an on/off switch for the autonomous drive system or a turn knob having pre-set positions.

In addition to, or instead of, the position of the communication device being indistinct around the autonomous drive resting position, the communication device may be arranged to vibrate when a performance loss is detected by the autonomous drive system.

A play around a resting position or a control position will make a user feel that the position of the communication device is less distinct than would have been expected. This type of haptic signal may be used, for instance, in situations when the conditions for using the AD system are non-ideal, but still sufficiently good for autonomous drive. The indistinct position will then be a warning to the user of the communication device that the conditions for using the AD system may further deteriorate and that manual takeover of the driving may become necessary.

A snap-in function may be used to signal to the user of the communication device that a desired command position has been reached and that the command corresponding to the position has been accepted by the AD system. Accordingly, the communication device snaps into the command position which may be felt by a user of the device as a click and/or a force pulling the communication device into the position where it is retained to signal acceptance of the input command. In addition to haptic signals, the user may be provided with auditory and visual signals. In the case of a snap-in function, a clicking sound may be heard when the communication device snaps into position. The status of the AD system, in particular with regard to whether the command has been accepted or not may be shown on a display device or on the communication device itself.

A failure to lock the communication device in a desired command position may be used to signal to the user of the communication device that the command cannot be accepted by the AD system.

In the interface arrangement as described herein, the autonomous drive system may be arranged to over-rule an accepted command received through the communication device if changing driving conditions has made execution of the command unsuitable.

The interface arrangement as disclosed herein may be used in a vehicle which is equipped with controls for manual drive of the vehicle allowing a user of the vehicle to switch between autonomous drive mode and manual drive mode. In the first case, the vehicle is driven by the AD system and in the second case, the user of the vehicle becomes the driver of the vehicle.

In a vehicle being equipped for manual drive, in addition to being provided with an autonomous drive system, the communication device may be configured for use as an automatic gearstick when the vehicle is in manual drive mode.

There is also provided a method for communication between a user of a vehicle comprising an autonomous drive system and an interface arrangement as disclosed herein. The method comprises inputting a command into the autonomous drive system by moving the manually operated communication device by hand from a first of the predetermined positions to a second of the predetermined positions, and receiving a haptic response from the autonomous drive system through the communication device. As set out herein, the haptic response may signal acknowledgement from the AD system that the command has been received and/or that the command has been accepted by the AD system.

BRIEF DESCRIPTION OF THE DRAWINGS

The present disclosure will hereinafter be further explained by means of non-limiting examples with reference to the appended drawings wherein:

FIG. 9 shows diagrammatically an indication of AD performance loss; and.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

In the following the disclosure will be described with reference to embodiments. The embodiments are only examples intended to illustrate the disclosure and should not be considered limiting to the disclosure. Hence, the scope of the disclosure is defined by the appended claims. It is also to be understood that the different diagrammatically illustrated command situations shown in the figures and described herein can be embodied in any combination in a single communication device or can be embodied in two or more communication devices in an interface arrangement according to the disclosure. Further, the interface arrangement according to the disclosure may be configured to only permit some of the commands described below to be performed. All or any command as described below may be associated with a haptic response signal from the autonomous drive system of the vehicle. Although the commands are described together with examples of corresponding haptic signals from the autonomous drive, AD, system, it is to be understood that the haptic signals could be different from those described or that one or more of the commands could lack a corresponding haptic signal. Any or all commands may be performable without a corresponding haptic signal.

The forces indicated in the diagrams included in the figures are only intended as examples. Accordingly, it is to be understood that the force curves may be differently designed within the scope of the disclosure. All forces shown in the figures are forces which are experienced by the user of the interface arrangement when moving the communication device from the resting position for autonomous drive, A.

In addition to haptic feedback and the positioning of the communication device of the interface arrangement as disclosed herein, the vehicle may be provided with any other type of equipment and arrangements for conveying information to a user of the vehicle. For some or all commands, feedback from the AD system may be provided only as non-haptic signals. Such additional or alternative feedback may be visual feedback in the form of text, symbols, pictures, diagrams, etc. which are shown on a display device, or as other visual indicators as known in the art. Further, haptic feedback may be augmented by or replaced by sound signals. In the case of a sound signal being used together with a haptic signal, the sound may be generated simultaneously with movement of the communication device and may provide an audible confirmation of an accepted command, such as a click which is heard when the communication device snaps into a new position. Haptic feedback from the communication device may also be enhanced or replaced by haptic feedback e.g. from the user's seat such as a vibration in the seat induced when a lane marking is being crossed.

Furthermore, the interface arrangement is described with reference to a car. However, it is to be understood that the disclosure is equally applicable to any vehicle adapted for personal transportation, such as a truck, a bus etc. The disclosure may be particularly applicable to vehicles which are intended to be driven on public roads.

Figure 1:
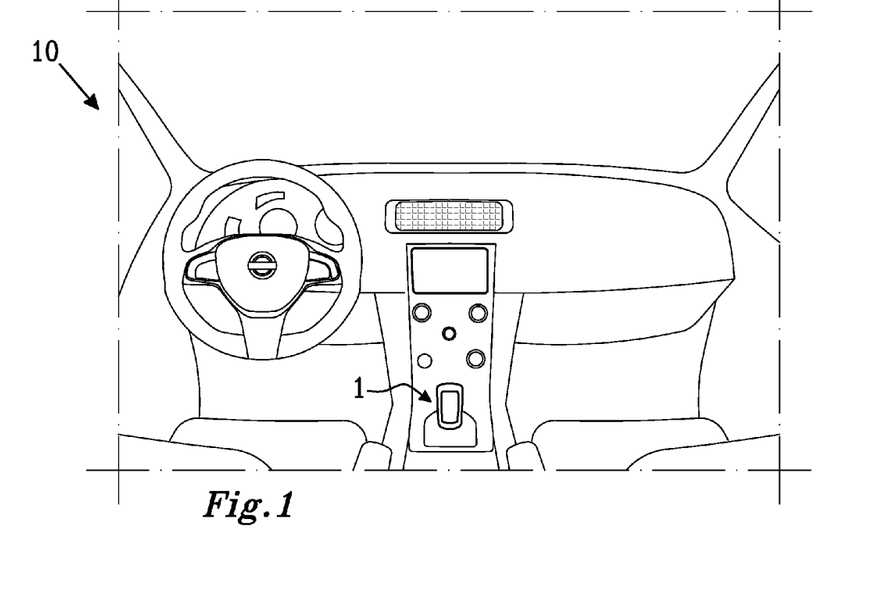
FIG. 1 shows a communication device in an interface arrangement as disclosed herein.

With reference to FIG. 1, there is shown a communication device 1 which is arranged to be manually operated by a user of a car 10 or other vehicle. The user is typically seated in a driver's seat in the car 10 and the communication device 1 is placed so that it is readily accessible to the user. The car 10 is equipped with an autonomous drive system, also referred to herein as an AD system and may have equipment for alternative manual drive (MD) of the car 10 such as a steering wheel, pedals or other controls for manual driving. The communication device 1 is part of an interface arrangement between the AD system and the user wanting to interact with the AD system. Although not shown in the figure, the car 10 may be provided with additional equipment for transferring information to a user of the car, such as display devices and loud-speakers.

The communication device 1 may be ergonomically shaped such that it can be comfortably gripped and held by the user when using the device 1. The communication device is designed to be movable in at least two dimensions, such as in an x-y plane. The communication device 1 may optionally be movable by pulling or pushing in the z-direction perpendicular to the x-y plane or in other directions at an angle to the x-y plane. In the example shown in FIG. 1, the communication device 1 is designed as a joystick and is moveable in a curved geometry, e.g. around a ball-and-socket joint such that it can be tilted in any direction from the central resting position shown in FIG. 1, such as forward, rearward or to the sides.

As set out herein, the communication device 1 is placed in a location that is intuitive to a driver/user who is to control the device. Such location may be where a gear stick is conventionally placed in the car 10. As shown in FIG. 1, the communication device 1 may be similar in design to a conventional automatic gear-stick and may be constructed to be used as an automatic gear-stick if the car 10 is of the type provided with equipment for manual drive.

In the examples below, it is referred to a communication device 1. The communication device 1 may be the joystick shown in FIG. 1 or may be any other communication device as defined in the appended claims.

Figure 2:
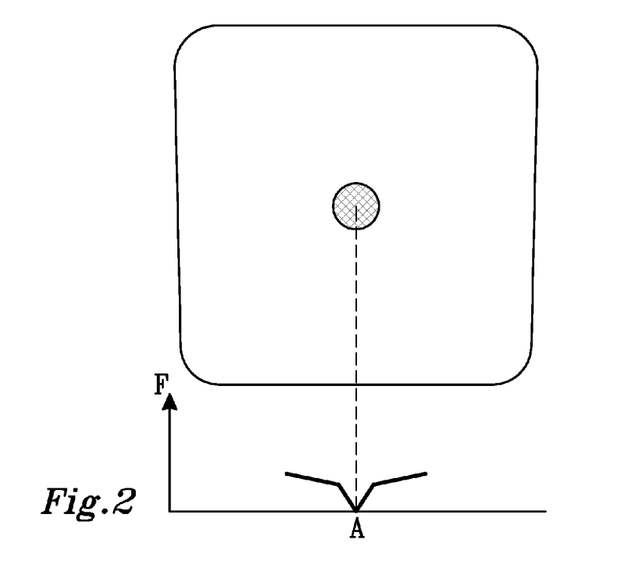
FIG. 2 shows diagrammatically a snap-in position.

With reference to FIG. 2, there is illustrated a control position A in which the car 10 is driving autonomously along a predefined route which may be determined by a track, a guiding vehicle, or a programming for navigation to a desired destination. The position A may also be referred to as a "resting position" implying that the interface arrangement of the car 10 is not being used and that the AD system is working in a fully automatic mode.

Haptic signals corresponding to the resting position A may be that the communication device 1 snaps into the position A and/or that movement of the communication device 1 out of the resting position A requires application of force to overcome an initial resistance to movement away from the resting position A. This is illustrated by the force diagram in FIG. 2.

Figure 3:
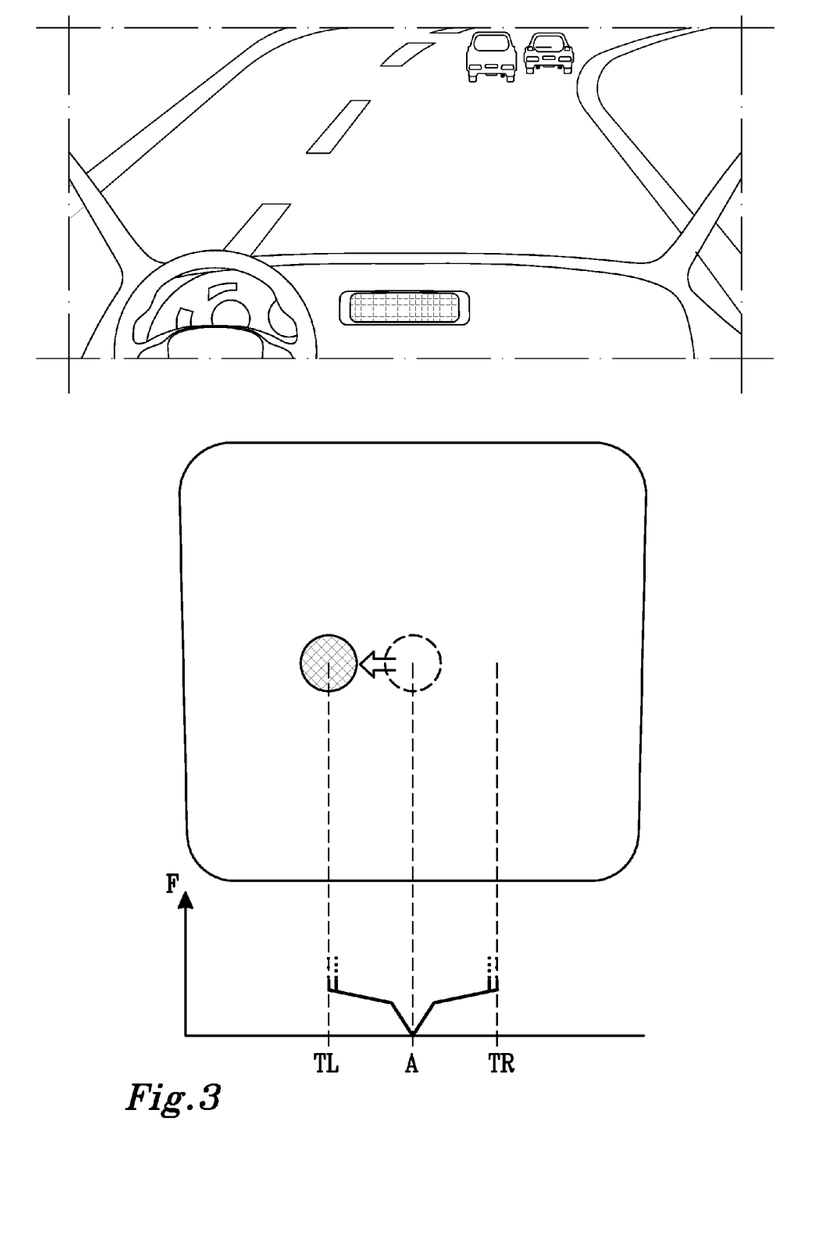
FIG. 3 shows diagrammatically a command to move sideways.

FIG. 3 illustrates how the communication device 1 may be used to input a command for moving the car 10 laterally on a road while keeping inside a lane. By applying force to the communication device 1, it can be moved to the right, in a direction towards an outer right limit TR inside a lane or to the left, in a direction towards an outer left limit TL inside a lane. When releasing the communication device 1, it will automatically return to the resting position A. When moving the communication device 1 to either side, TR or TL, the car 10 will move slightly in the same direction, always keeping within the lane and at a safe distance to any objects and sides of the lane.

The communication device 1 can be freely moved in the lateral direction until the AD system sends back a haptic signal to the communication device 1 in the interface arrangement indicating that further movement in the commanded direction will cause the vehicle to leave the lane it is currently driving in. The haptic feedback from the AD system may be a pulsating motion transferred from the communication device 1 to the hand of the user. The pulsating motion may be designed to resemble or emulate the shake of a car 10 when the wheels are rolling over three-dimensional structured or patterned road markings.

Figure 4:
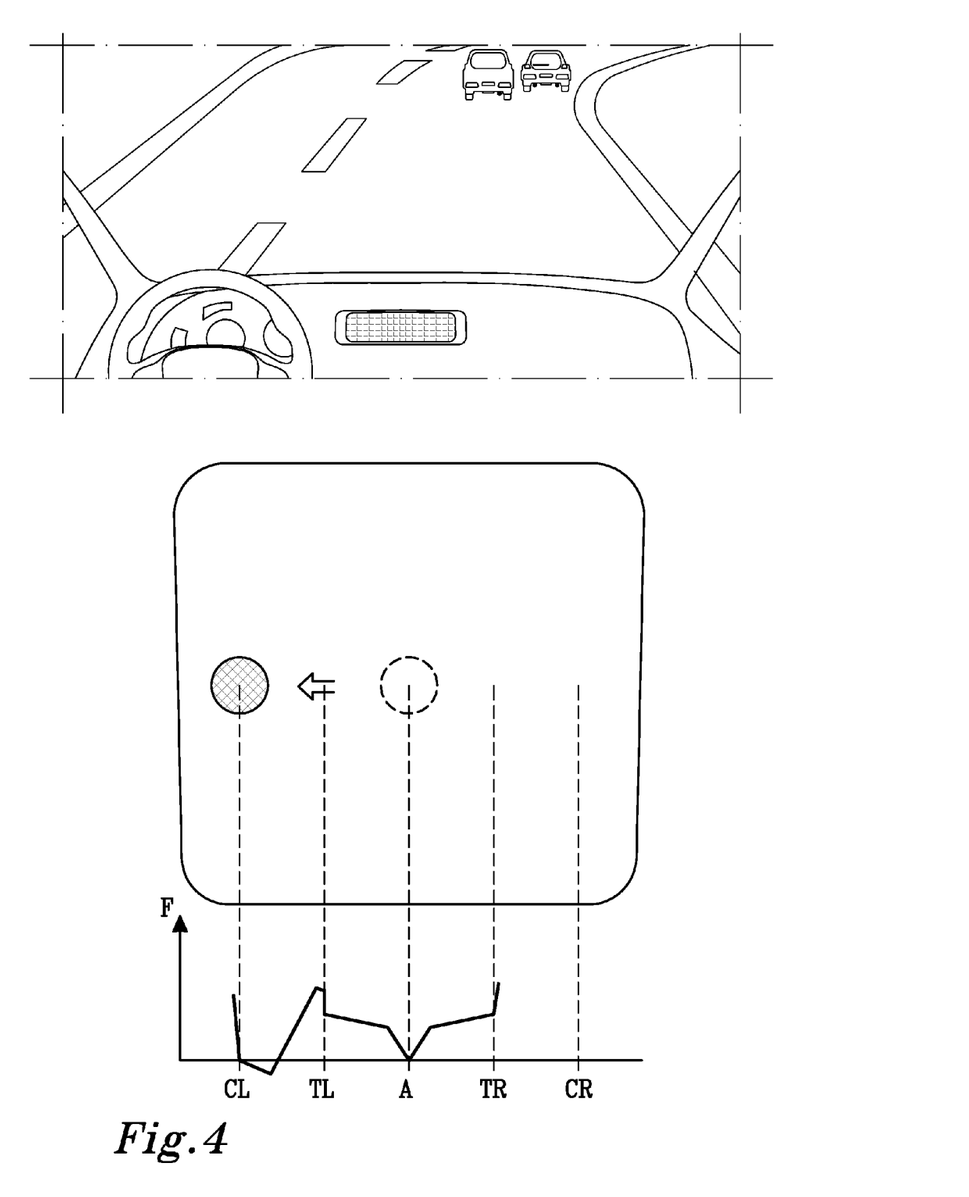
FIG. 4 shows diagrammatically a command to change lanes.

FIG. 4 illustrates how the communication device 1 may be used to input a command for changing lanes. The driver may input an instruction to the AD system to change lanes by moving the communication device 1 from the resting position A, laterally past a perceived obstruction, such as a perceived ridge at a position TL or TR corresponding to a lateral limit of the lane in which the car 10 is currently driving. When moving the communication device 1 past the position TL or TR, the user will need to apply somewhat more force to the communication device 1, as indicated in the force-diagram in FIG. 4.

If the driving conditions permit the AD system to accept the command from the user, this is signaled to the user by the communication device 1 being retained in the new position which then becomes a new rest position CL or CR. The acceptance of the command by the AD system is signaled to the user both by the fact that it is possible to move the communication device 1 past the obstruction at the position TL or TR and that the communication device 1 snaps into and is retained in the new resting position CL or CR. The snap-in function is illustrated in the force diagram in FIG. 5 as a force contribution from the system. This "negative" resistance will be perceived by the user as the system helping to snap the communication device into the new rest position.

After the command has been executed by the AD system, the communication device returns to the original resting position A.

In a situation where the AD system first accepts a command to change lanes but where it is subsequently determined that a lane change has become inappropriate before the command has been executed, the AD system may interrupt the execution of the command and send a signal through the interface arrangement causing the communication device 1 to return to the original resting position A.

Figure 5:
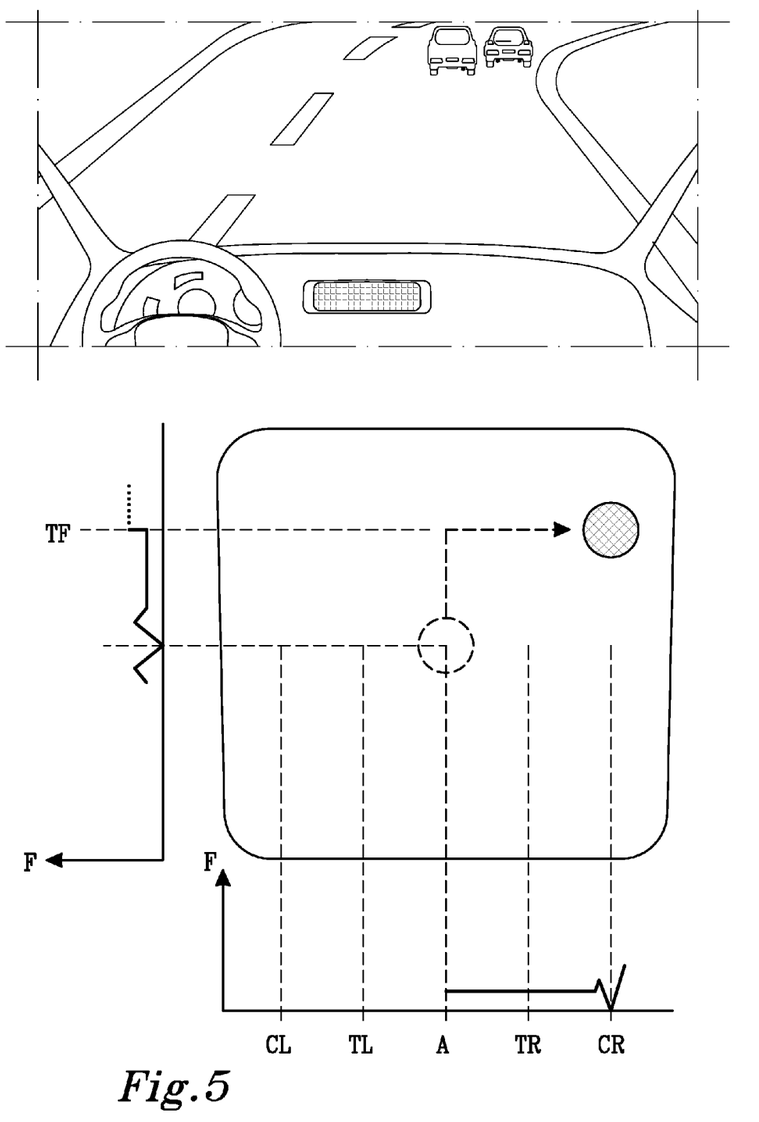
FIG. 5 shows diagrammatically a command to make a turn.

FIG. 5 illustrates how the communication device 1 may be used to input a command for making a turn at the next possible opportunity. A turn may be commanded by moving the communication device 1 forwards from the original resting position A to a forward position TF and then to the right or to the left, indicating a right turn or a left turn, respectively. If the AD system accepts the command, the communication device 1 will be retained in the new position, CR/TF as shown in FIG. 5 to indicate a right turn.

After the command has been executed by the AD system, the communication device returns to the original resting position A.

If the AD system currently cannot accept the command, this can be signalled to the user of the interface arrangement by it not being possible to move the communication device 1 in the lateral direction. Alternatively, the communication device 1 may not be retained in the new position CR (or CL)/TF but will instead move back automatically to the original resting position.

The user of the interface arrangement may also have the opportunity of interrupting the command by releasing the communication device 1 from the new position CR/TF. The communication device 1 will then move back to the original resting position A.

Haptic signals to the user of the interface arrangement may be perceived as an obstruction/ridge at the forward position TF and at the TF/CR or TF/CL positions. The signals at the sideways resting positions TF/CR and TF/CL may be similar to the lane change signals as described in connection with FIG. 4.

Figure 6:
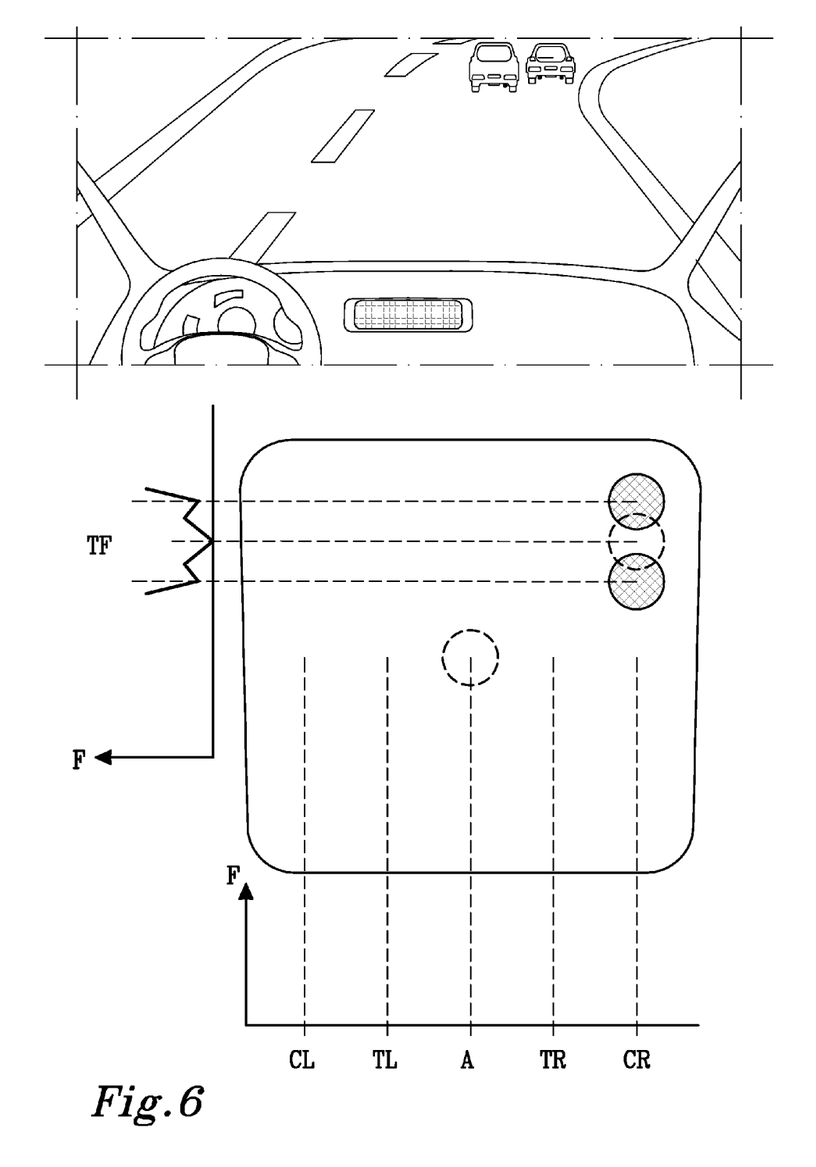
FIG. 6 shows diagrammatically a command to make a turn further ahead.

FIG. 6 illustrates how the communication device 1 may be used to input a command for making a turn further ahead on the road. The command starts with the communication device 1 in the resting position TF/CR or TF/CL for "take next turn" as described in connection with FIG. 5. From this position, the communication device 1 is pushed forward into a TF'/CR or TF'/CL position. This is a temporary position and when the user releases the communication device 1, it swaps back into the original TF/CR or TF/CL resting position. One push forward is a command to "turn onto the second road" and two subsequent forward pushes is a command to "turn onto the third road", and so on. Pulling the communication device 1 rearwards may be used as a command to count down the number of roads to pass before turning in a corresponding manner. The AD system may send back an accept signal confirming the number of roads to pass before turning.

Forward and rearward movement of the communication device 1 may be perceived by the user by the presence of an obstruction/ridge being located forward or rearward of the resting position TF/CR or TF/CL as indicated in the force diagram.

Figure 7:
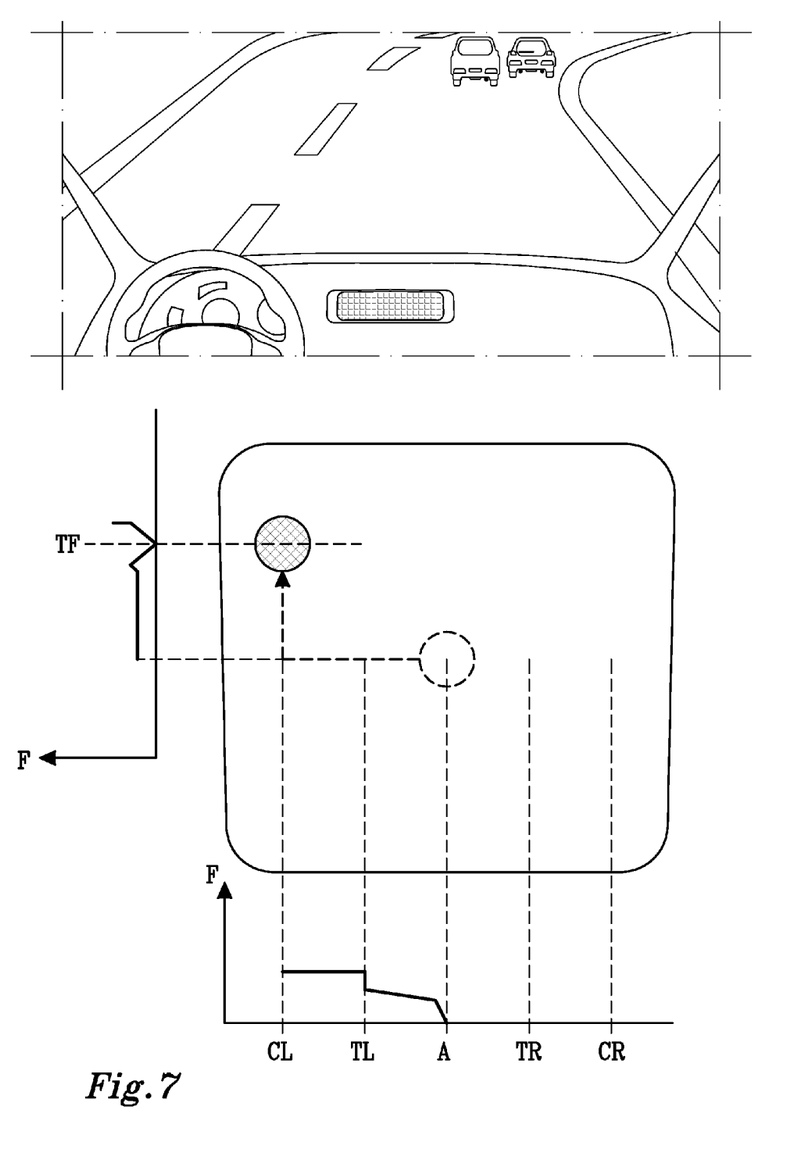
FIG. 7 shows diagrammatically a command to overtake a vehicle.

FIG. 7 illustrates how the communication device 1 may be used to input a command for overtaking a vehicle. As shown in FIG. 7, a command to overtake a vehicle travelling further ahead on the road begins with a sideways movement of the communication device 1 from the resting position A to the position CL and then forwards to the new resting position TF/CL.

If the AD system accepts the command, the communication device 1 will be retained in the new position, TF/CL. If the AD system currently cannot accept the command, this can be signaled to the user of the interface arrangement by it not being possible to move the communication device 1 in the lateral direction or in the forward direction. Alternatively, the communication device 1 may not be retained in the new position TF/CL but will instead move back automatically to the original resting position.

The user of the interface arrangement may also have the opportunity of interrupting the command by releasing the communication device 1 from the new position TF/CL. The communication device 1 will then move back to the original resting position A.

A command to overtake a preceding vehicle on the right-hand side is performed in the same way but starts with a sideways movement to the position CR and ends at a new forward resting position TF/CR.

A corresponding haptic signal may be perceived as an obstruction/ridge placed forwards and rearwards of the resting position TF/CL or TF/CR when pushing or pulling at the communication device 1. Signals in response to sideways movements may be similar to the lane change signals as described in connection with FIG. 4.

Figure 8:
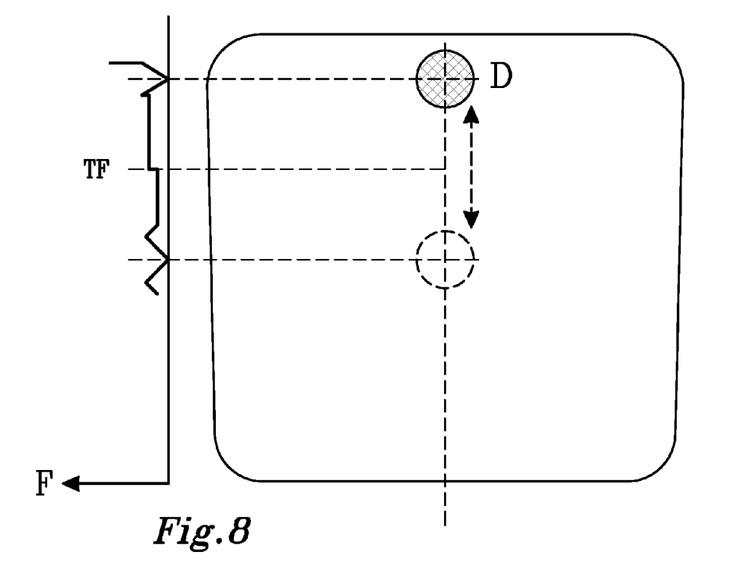
FIG. 8 shows diagrammatically a command to enter or exit AD mode.

FIG. 8 illustrates how the communication device 1 may be used to input a command for entering or exiting AD mode from MD mode in a car 10 or other vehicle being equipped for manual drive.

When starting the car 10, the person using the communication device 1 begins by moving the communication device 1 from the resting position A forward to the position D in analogy with any car 10 having an automatic gearbox. When the user subsequently moves the control rearwards from the D position to the AD position, the car 10 enters AD mode on condition that the AD system is capable of accepting the command. If the AD system determines that the driving conditions do not permit automatic drive, it will not be possible to move the communication device 1 rearwards from the D position or, alternatively, the communication device 1 will not be retained in the A position but will immediately move back to the D position.

The user can always leave the AD mode and take control of the manual drive equipment by pushing the communication device 1 forward into the DRIVE position D, where the communication device 1 will be retained, or by performing driving actions such as braking, accelerating or steering. The force diagram in FIG. 8 indicates haptic signals being perceived as a resistance to movement forward and rearward of the resting position A and rearward of the resting position D.

When the user makes a manual take over, such as grabbing and actively moving the steering wheel, or otherwise manually disables the AD system, the communication device 1 automatically moves from the A to the D position.

Figure 9:
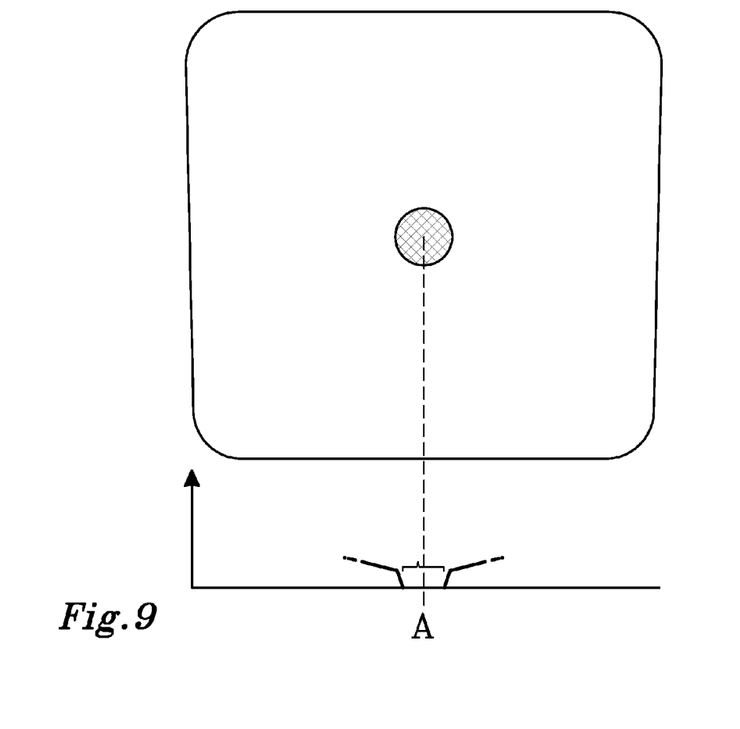

FIG. 9 illustrates how the communication device 1 may be used to indicate an AD performance loss to a user of the interface arrangement between the AD system and the user. It should be noted that in a vehicle being equipped for autonomous drive, but lacking an interface arrangement as disclosed herein, the principles of indicating a performance loss as set out herein may be applied to any manually operated control being connected to the AD system of the vehicle.

When the conditions for using the AD system are less than 100% (fully satisfactory or ideal) but still good enough (satisfactory but non-ideal) for employing auto drive, the user can be informed about this and thereby be pre-warned that a situation may be up-coming requiring manual takeover of the driving of the car 10. Such an indication to the user may be performed by changing the feeling of the communication device 1 when it is in the resting position A.

In normal AD mode, the resting position A is perceived as a distinct position when gripping the communication device 1. When the driving conditions deteriorate, the feeling of the communication device 1 changes in such a way that the resting position A is perceived as being non-distinct. The communication device 1 is perceived to have a play around the position A and can be freely moved within a limited area surrounding the resting position A. Alternatively or additionally, the control can begin to rattle or vibrate.

Figure 10:
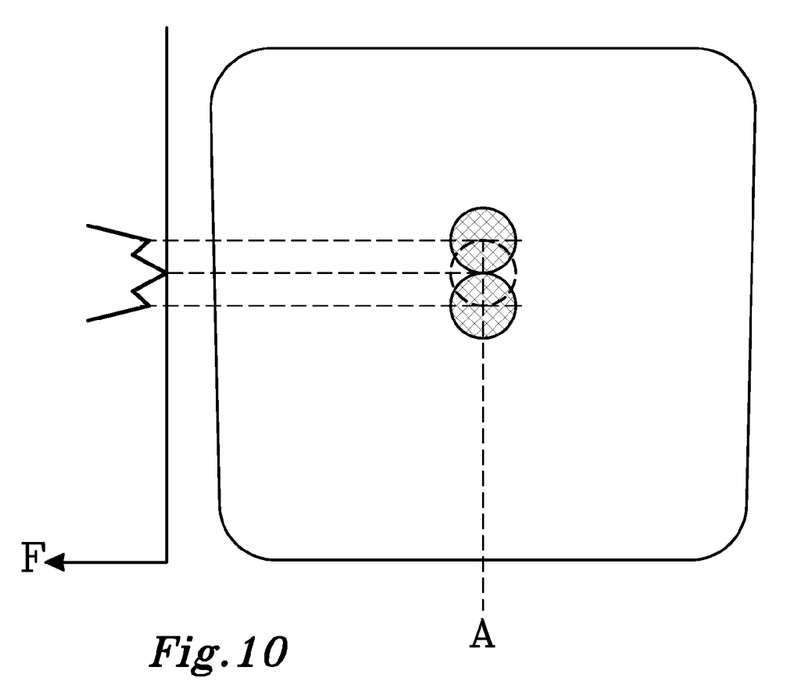
FIG. 10 shows diagrammatically a command to increase or decrease speed.

FIG. 10 illustrates how the communication device 1 may be used to input a command for increasing or decreasing speed.

A slight movement of the communication device 1 forward or rearward from the resting position A means a command to increase or decrease the speed, respectively. The communication device 1 does not stay in the new position, but moves back to the resting position A when it is released. The AD system ascertains that the speed is always within safe and appropriate limits. Pushing or pulling at the communication device 1 takes place against a force resistance, as indicated in the force diagram in FIG. 10. When the speed cannot be further adjusted, this may be indicated by a small pulsation in the communication device 1.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the appended claims. Additionally, the features of various implementing embodiments may be combined to form further embodiments.

What is claimed is:

1. An interface arrangement for use in a vehicle having an autonomous drive (AD) system, the interface arrangement being an interface between a user of the vehicle and the autonomous drive (AD) system, the interface arrangement comprising:
    a manually operated communication device movable between multiple predetermined positions and configured to input commands into the autonomous drive (AD) system;
    wherein each predetermined position of the manually operated communication device codes for a command to the autonomous drive system, and wherein the communication device comprises a joystick which functions as a gear stick of an automatic transmission for selection of a transmission state when the vehicle is in a manual driving mode.

2. The interface arrangement of claim 1 wherein the multiple predetermined positions include discrete resting positions and continuously arranged positions, the continuously arranged positions being arranged non-stepwise along a line of movement of the communication device.

3. The interface arrangement of claim 1 wherein the interface arrangement is arranged to output a haptic signal from the autonomous drive (AD) system to the communication device in response to an input command received by the autonomous drive (AD) system from the communication device.

4. The interface arrangement of claim 3 wherein the communication device is arranged to output a haptic signal as an indication of acceptance of an input command.

5. The interface arrangement of claim 1 wherein the pre-determined positions of the communication device are arranged to code for one or more of the following commands:
    a vehicle stop;
    a lane change;
    a left turn;
    a right turn;
    a change in vehicle speed;
    an overtaking of a preceding vehicle; and
    entering or exiting autonomous drive (AD) mode.

6. The interface arrangement of claim 3 wherein the haptic signal is chosen from one or more of:
    a vibration;
    a resistance to movement;
    a play around a resting position or a control position;
    a snap-in function; and
    a failure to retain the communication device in a new position.

7. The interface arrangement of claim 1 wherein the autonomous drive system is arranged to overrule an accepted command received through the communication device if changing driving conditions has made execution of the command unsuitable.

8. The interface arrangement of claim 1 wherein the communication device is arranged to communicate an autonomous drive (AD) performance loss to a user of the interface arrangement when the conditions for using the autonomous drive (AD) system are below a predetermined optimal level, the performance loss being perceptible as a haptic signal from the communication device when the communication device is in an autonomous drive (AD) resting position (A).

9. The interface arrangement of claim 8 wherein the autonomous drive (AD) resting position (A) is arranged to be perceived as a distinct position when gripping the communication device when no performance loss is detected by the autonomous drive system, and wherein the autonomous drive (AD) resting position (A) is arranged to be perceived as having a play around the autonomous drive (AD) resting position (A) and being freely movable within a limited zone surrounding the autonomous drive (AD) resting position (A) when gripping the communication device when a performance loss is detected by the autonomous drive (AD) system.

10. The interface arrangement of claim 8 wherein the communication device is arranged to vibrate when a performance loss is detected by the autonomous drive (AD) system.

11. A vehicle comprising the interface arrangement of claim 1.

12. The vehicle of claim 11 further comprising controls for manual drive (MD) of the vehicle.

13. The vehicle of claim 12 wherein the communication device is configured for use as an automatic gearstick when the vehicle is in manual drive (MD) mode.

14. A method for communication between a user and an autonomous drive (AD) system of a vehicle, the vehicle having an interface arrangement comprising a manually operated communication device movable between multiple predetermined positions and configured to input commands into the autonomous drive (AD) system, wherein each predetermined position of the manually operated communication device codes for a command to the autonomous drive (AD) system, the method comprising:
  inputting a command into the autonomous drive (AD) system by moving the manually operated communication device from a first one of the predetermined positions to a second one of the predetermined positions; and
  receiving a haptic response from the autonomous drive (AD) system through the communication device;
  wherein the communication device comprises a joystick which functions as a gear stick of an automatic transmission for selection of a transmission state when the vehicle is in a manual driving mode.

15. A method for communication between a user and an autonomous drive (AD) system of a vehicle, the vehicle having an interface arrangement comprising a manually operated communication device movable between multiple predetermined positions and configured to input commands into the autonomous drive (AD) system, wherein each predetermined position of the manually operated communication device codes for a command to the autonomous drive (AD) system, the method comprising:
  receiving a command at the autonomous drive (AD) system in response to the user moving the manually operated communication device from a first one of the predetermined positions to a second one of the predetermined positions; and
  providing a haptic response from the autonomous drive (AD) system through the communication device;
  wherein the communication device comprises a joystick which functions as a gear stick of an automatic transmission for selection of a transmission state when the vehicle is in a manual driving mode.

* * * * *